Figure 1:
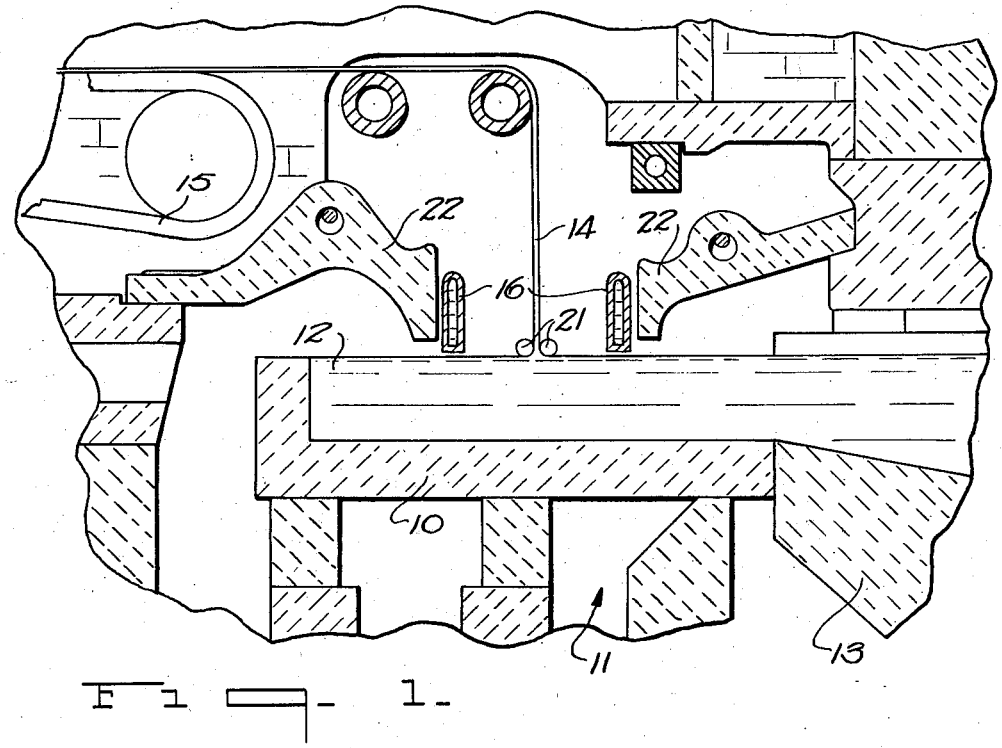

May 20, 1930.  J. L. DRAKE  1,759,227

METHOD OF OPERATING SHEET GLASS COOLERS

Filed Nov. 9, 1926

Inventor
John L. Drake.
By Frank Fraser,
Attorney

Patented May 20, 1930

1,759,227

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

METHOD OF OPERATING SHEET-GLASS COOLERS

Application filed November 9, 1926. Serial No. 147,260.

This invention relates to improvements in sheet glass apparatus and has more particular reference to a novel form of cooler for association therewith.

In certain processes for drawing sheet glass, such as that disclosed in the patent to Colburn 1,248,809, granted Dec. 4, 1917, a pair of coolers is arranged at opposite sides of the sheet, and relatively close to the surface of the molten glass from which the sheet is drawn, to absorb sufficient heat to permit the drawing of a good sheet of glass.

Certain types of these coolers are so constructed that moisture will condense upon the outer surface of the walls thereof, and which condensation causes the coolers to rust. This rust frequently falls down into the molten glass from which the sheet is drawn and subsequently finds its way into the sheet, producing defects therein. Again, in other coolers, the condensation of moisture forms a film upon the outer surface of the walls thereof so that it becomes necessary that these coolers be frequently cleaned in order to remove this film.

It is the primary object of the present invention to provide a cooler, so constructed as to elminate the condensation of moisture upon the outer surface of the walls thereof.

A further object of the invention is to provide such an improved cooler having relatively thick walls which will allow the exterior surfaces thereof to attain to a temperature sufficiently great to prevent condensation of moisture thereon.

A still further object of the invention is to provide such an improved cooler including a hollow casing, and means for circulating a cooling medium therethrough, the walls of the cooler being relatively thick to permit the outer surfaces thereof to be heated to a temperature sufficiently great to prevent condensation of moisture thereon without raising the cooling medium contained therein to an equal temperature.

Other objects and advantages of the invention will become more apparent during the course of the following description when taken in connection with the accompanying drawings.

Figure 2:
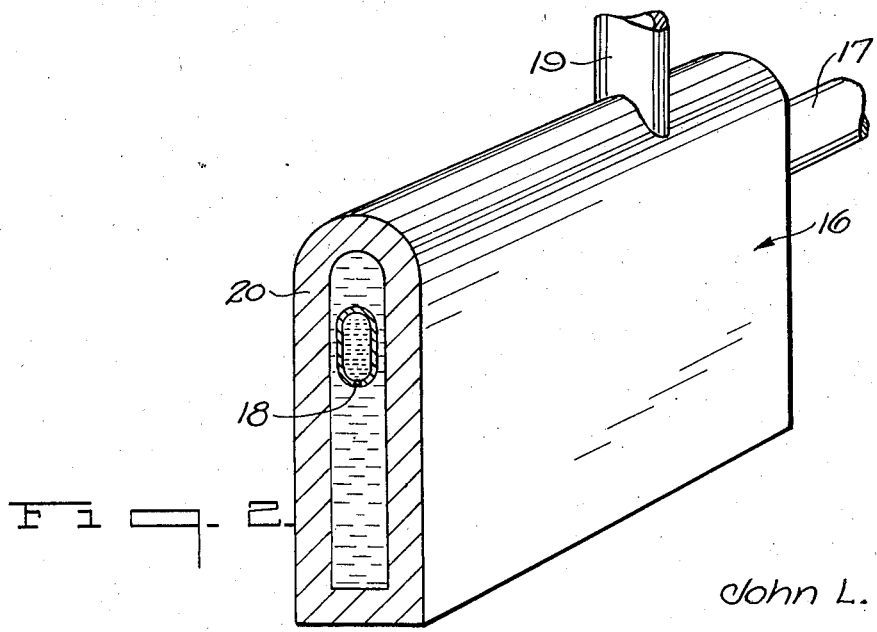

In the drawings forming a part of this application and wherein like numerals are employed to designate like parts throughout the same, Fig. 1 is a longitudinal vertical section of a portion of sheet glass drawing apparatus, showing associated therewith, in cross section, a pair of coolers constructed in accordance with the present invention, and Fig. 2 is a perspective sectional view of one of the improved coolers.

Referring now more in detail to the accompanying drawings, the numeral 10 generally designates a receptacle or draw-pot supported above a heating chamber 11 and containing a mass of molten glass 12 which is continuously supplied thereto from a tank furnace 13. A sheet of glass 14 is drawn from the molten glass 12 in the receptacle, by means of the drawing mechanism 15.

To maintain the sheet to width, knurled rollers 21, or similar means, are arranged at opposite sides of the sheet at both edges thereof, and are driven at a speed to enable a relatively heavy knurled edge to be formed on the sheet which is capable of holding the same to width. Arranged above the pot 10 are cover or lip tiles 22 which tend to force any heat currents present at that position downwardly toward the surface of the molten glass 12.

Positioned at each side of the sheet 14 and immediately adjacent the surface of the molten glass 12, are the improved coolers 16, which serve to protect the sheet from heated air currents escaping from the furnace and heating chamber, and at the same time aid in absorbing sufficient heat from the molten glass passing thereunder to give it the proper viscosity to permit it to be drawn away in sheet form.

The improved coolers are identical in construction so that a detail description of only one of them is thought to be necessary. Each cooler is preferably made of suitable metal and, as shown, is designed to form a hollow elongated casing which is adapted to be internally cooled by circulating a cooling medium therethrough, such as relatively cool water. This cooling medium enters the cooler through the pipe 17 extending longitudinally within the casing and passes from the said pipe through a plurality of openings 18 therein, into the casing. This cooling medium as it becomes heated, passes upwardly and exteriorly of the cooler through the pipe 19.

As stated above, certain types of these coolers are so constructed that moisture will condense upon the outer surfaces thereof, and which condensation is injurious to the production of a good sheet of glass. In accordance with the present invention, the walls of the cooler, indicated at 20, are relatively thick to permit the outer surfaces thereof to be heated to a temperature sufficiently great to prevent condensation of moisture thereon without raising the cooling medium contained therein to an equal temperature. That is to say, the walls 20 are sufficiently thick to allow the outer surfaces thereof to attain to a temperature of 212° Fahrenheit or over while, at the same time, allowing the water or cooling medium therewithin to remain at a temperature below 212° Fahrenheit. With the outer surfaces of the walls 20 at or above this temperature, no moisture will condense thereon and inasmuch as the cooling medium contained therein does not raise to this temperature, the cooling action of the cooler will not be materially reduced in efficiency, as would be the case were the temperature of the cooling medium also increased to 212° Fahrenheit.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of absorbing heat from a mass of molten glass or from a newly formed glass sheet, which consists in arranging a metallic casing adjacent thereto but out of contact therewith, in passing a stream of cooling liquid through said casing in contact with the outer side walls thereof, and in so relating the walls of the casing and the cooling liquid that the outer surfaces of said casing will attain to a temperature of 212° Fahrenheit or over while allowing the temperature of the liquid to remain below 212° Fahrenheit.

2. The process of absorbing heat from a mass of molten glass or from a newly formed glass sheet, which consists in arranging a metallic casing adjacent thereto but out of contact therewith, in passing a stream of water through said casing in contact with the outer side walls thereof, and in so relating the walls of the casing and the stream of water that the outer surfaces of said casing will attain to a temperature of 212° Fahrenheit or over while allowing the temperature of the water to remain below 212° Fahrenheit.

3. The process of absorbing heat from a mass of molten glass or from a newly formed glass sheet, which consists in arranging a metallic casing adjacent thereto but out of contact therewith, in passing a stream of cooling liquid through said casing in contact with the outer side walls thereof, in maintaining the outer surfaces of the side walls of the casing at a temperature of 212° Fahrenheit or over, and in simultaneously maintaining the temperature of the cooling liquid below 212° Fahrenheit.

4. The process of absorbing heat from a mass of molten glass or from a newly formed glass sheet, which consists in arranging a metallic casing adjacent thereto but out of contact therewith, in passing a stream of cooling water through said casing in contact with the outer side walls thereof, in maintaining the outer surfaces of the side walls of the casing at a temperature of 212° Fahrenheit or over, and in simultaneously maintaining the temperature of the water below 212° Fahrenheit.

Signed at Toledo, in the county of Lucas and State of Ohio, this 5th day of November, 1926.

JOHN L. DRAKE.